Figure 1:
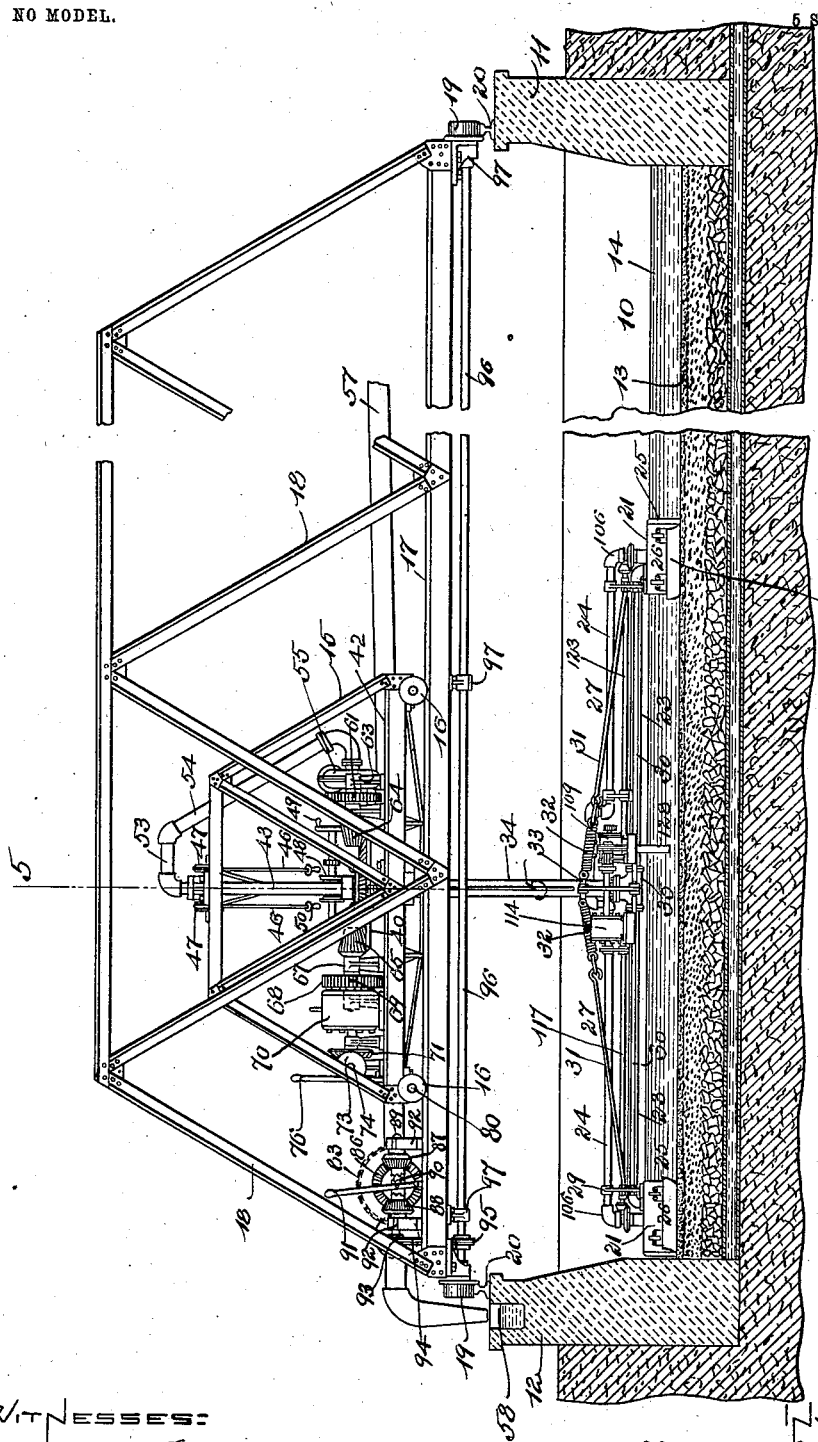

No. 729,719. PATENTED JUNE 2, 1903.
H. W. BLAISDELL.
APPARATUS FOR CLEANING SAND FILTER BEDS.
APPLICATION FILED MAY 3, 1902.
NO MODEL. 5 SHEETS—SHEET 1.

Witnesses:
Sydney E. Taft
William H. Forrest

Inventor:
Hiram W. Blaisdell
by his Attorney
Charles N. Gooding

No. 729,719. PATENTED JUNE 2, 1903.
H. W. BLAISDELL.
APPARATUS FOR CLEANING SAND FILTER BEDS.
APPLICATION FILED MAY 3, 1902.
NO MODEL. 5 SHEETS—SHEET 2.
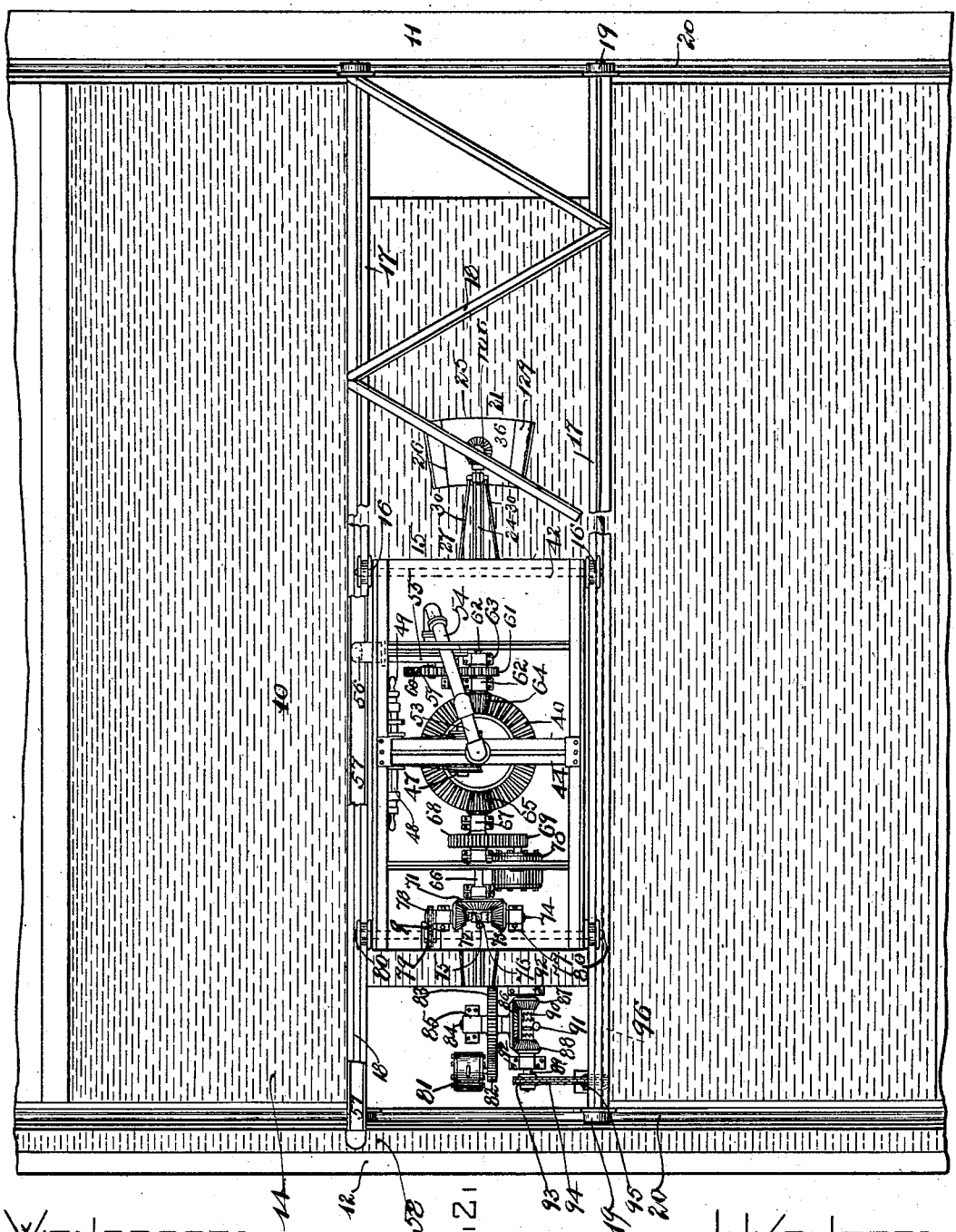

No. 729,719. PATENTED JUNE 2, 1903.
H. W. BLAISDELL.
APPARATUS FOR CLEANING SAND FILTER BEDS.
APPLICATION FILED MAY 3, 1902.
NO MODEL. 5 SHEETS—SHEET 3.
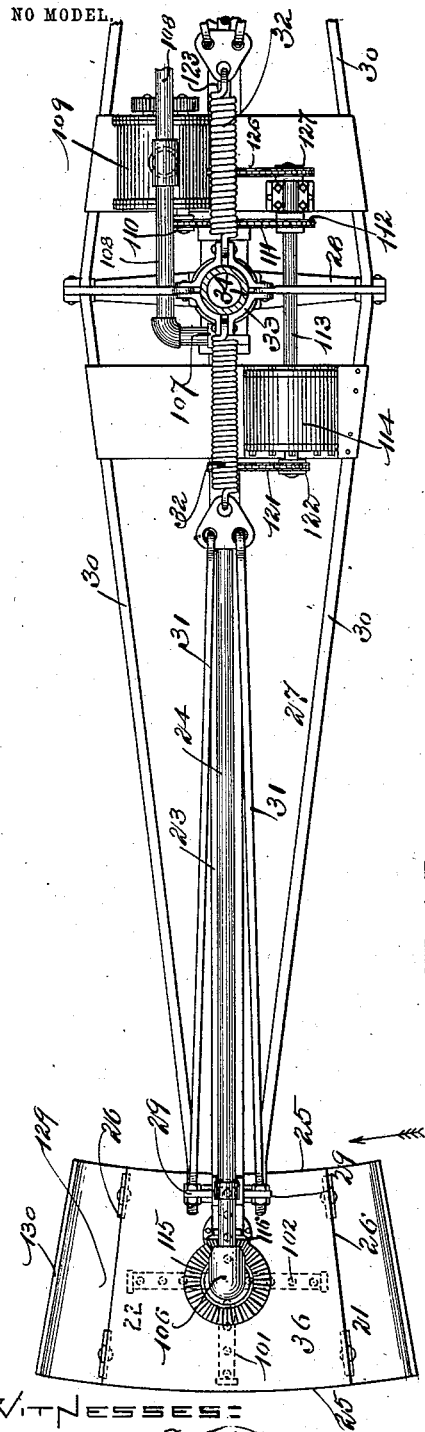
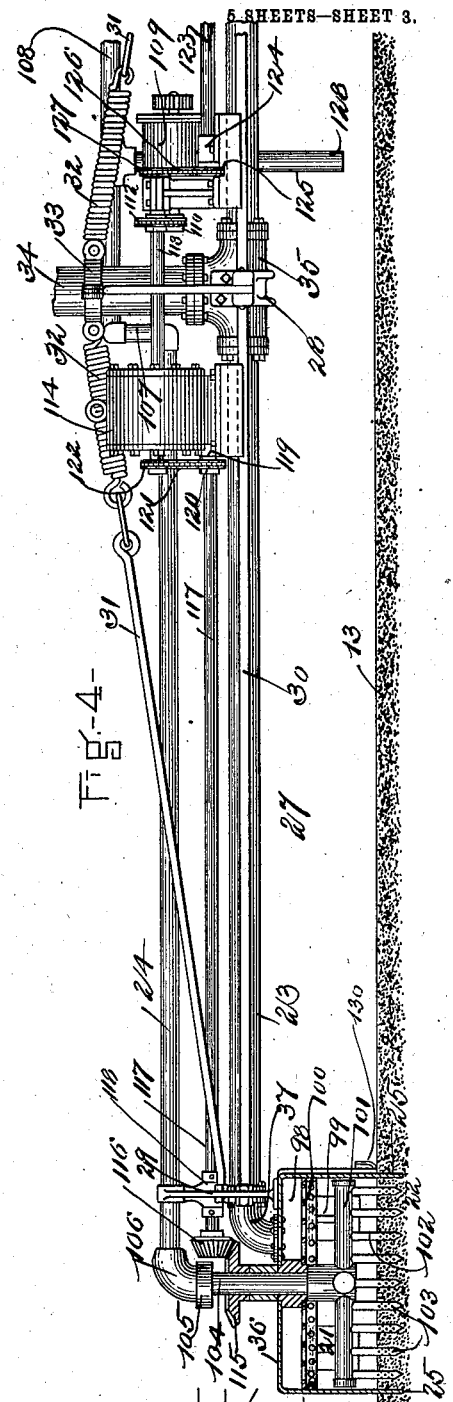
Witnesses:
Sydney E. Taft.
William H. Forrest.
Inventor:
Hiram W. Blaisdell
by his Attorney, No. 729,719. PATENTED JUNE 2, 1903.
H. W. BLAISDELL.
APPARATUS FOR CLEANING SAND FILTER BEDS.
APPLICATION FILED MAY 3, 1902.
NO MODEL. 5 SHEETS—SHEET 4.

WITNESSES:
Sydney C. Taft
William H. Forrest

INVENTOR:
Hiram W. Blaisdell
by his Attorney
Charles S. Goodwin

No. 729,719. PATENTED JUNE 2, 1903.
H. W. BLAISDELL.
APPARATUS FOR CLEANING SAND FILTER BEDS.
APPLICATION FILED MAY 3, 1902.
NO MODEL. 5 SHEETS—SHEET 5.
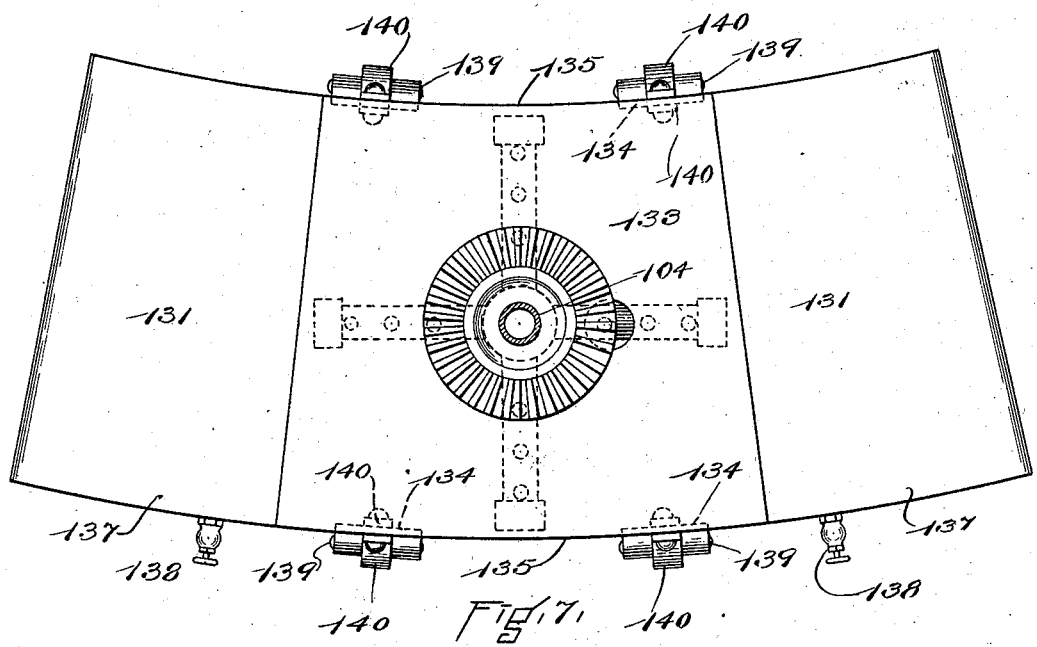
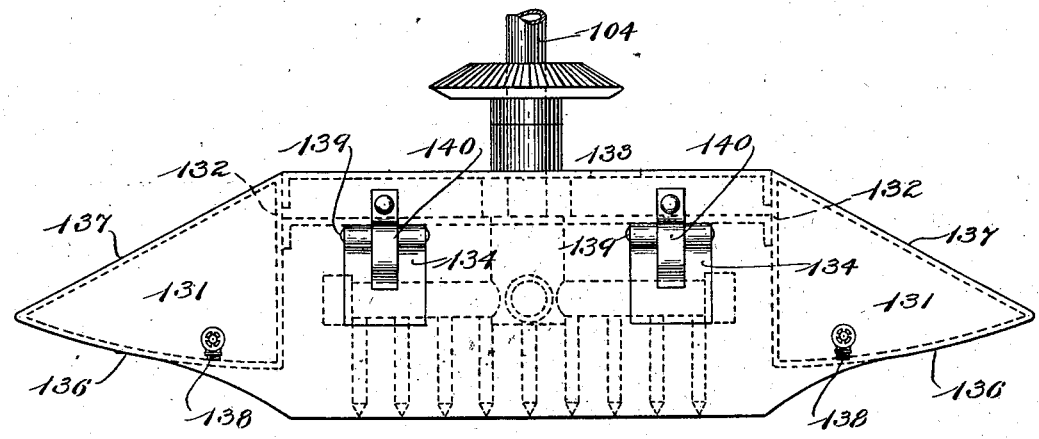
WITNESSES:
Sydney E. Taft.
William H. Forrest.
INVENTOR:
Hiram W. Blaisdell,
by his Attorney Charles N. Gooding No. 729,719. Patented June 2, 1903.

UNITED STATES PATENT OFFICE.

HIRAM W. BLAISDELL, OF YUMA, ARIZONA TERRITORY.

APPARATUS FOR CLEANING SAND FILTER-BEDS.

SPECIFICATION forming part of Letters Patent No. 729,719, dated June 2, 1903.

Application filed May 3, 1902. Serial No. 105,777. (No model.)

*To all whom it may concern:*

Be it known that I, HIRAM W. BLAISDELL, a citizen of the United States, residing at Yuma, in the county of Yuma and Territory of Arizona, have invented new and useful Improvements in Apparatus for Cleaning Sand Filter-Beds, (Case B,) of which the following is a specification.

This invention relates to an improved apparatus for cleansing the surface of the sand composing the bed of filters used in purifying the supply of water to cities and towns. These filters are of various kinds, but are usually laid out in a series of beds made of sand and inclosed by walls running longitudinally and transversely thereof. The water is introduced into the basin formed by the said walls and filters through the sand forming the filter-bed, thus leaving upon the surface of the sand the impurities previously contained in the water-supply. These impurities in time form a film or crust upon the upper surface of the sand, and the sand near the upper surface becomes covered with impurities, which interferes with the efficiency of the filter-bed, and it becomes necessary to remove this film or crust and to cleanse the sand upon the surface of the bed. As these filter-beds are of large area, to do this work of cleansing the surface without the aid of machinery or mechanical apparatus involves an enormous amount of labor and expense; and it is the object of this invention to provide an apparatus which will thoroughly remove the film or crust from the surface of the bed and also cleanse the sand upon the upper surface from the impurities hereinbefore set forth.

It is the further object of the invention to provide a strong, simple, and durable machine for the purpose hereinbefore set forth, and to provide a machine which shall be adapted to follow the inequalities of the surface of the filter-bed and to remove the impurities therefrom without removing the sand.

The invention consists, in an apparatus for cleaning sand filter-beds, of a mixing-chamber, means for washing the surface of the sand surrounded by said mixing-chamber, means for carrying said mixing-chamber over the surface of said filter-beds, and mechanism to revolve said mixing-chamber about an axial center located outside said mixing-chamber.

The invention again consists in a mixing-chamber, mechanism for carrying said mixing-chamber over the surface of said filter-beds, means guided by the upper surface of said filter-beds to determine the relative location of said mixing-chamber to said surface, and mechanism to revolve said mixing-chamber while it is being carried over the surface of the filter-beds about an axial center located outside said mixing-chamber.

The invention again consists, in an apparatus of the character described, of a mixing-chamber, a rake inclosed within said mixing-chamber, mechanism to rotate said rake, and mechanism to revolve said mixing-chamber and rake about an axial center located outside said mixing-chamber.

The invention further consists, in an apparatus of the character described, of a vertical rotary suction-pipe, a horizontal suction-pipe fast to the lower end thereof, and a mixing-chamber supported upon said horizontal suction-pipe, the interior of the mixing-chamber being connected to said suction-pipe about an axial center located outside said mixing-chamber.

The invention still further consists in a vertical suction-pipe, a carrier-frame fast thereto arranged to rotate in a horizontal plane, a mixing-chamber supported upon said carrier-frame, and mechanism to rotate said suction-pipe and carrier-frame about an axial center located outside said mixing-chamber and revolve said mixing-chamber about said axial center.

The invention finally consists in the combination and arrangement of parts set forth in the following specification, and particularly pointed out in the claims thereof.

Figure 5:
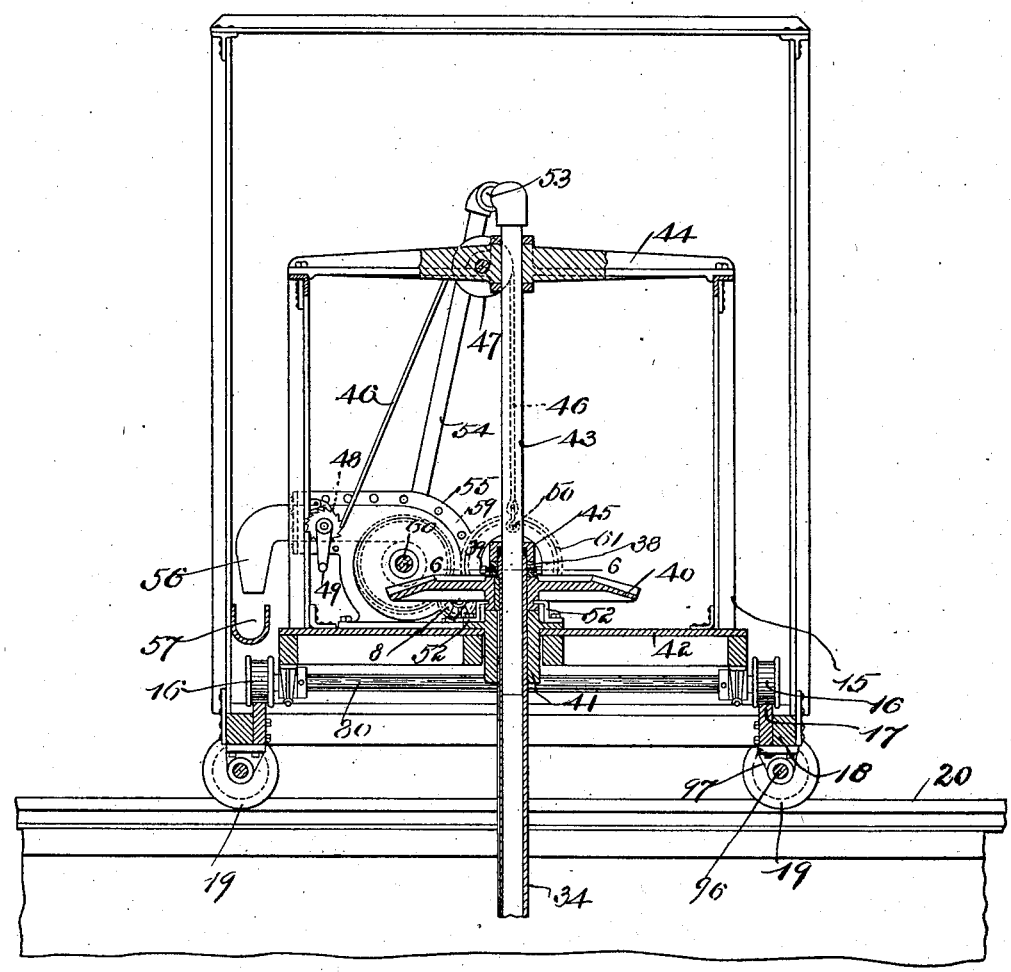
Figure 6:
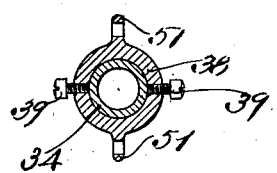

Referring to the drawings, Figure 1 is a transverse section of a sand filter-bed with the inclosing walls and my improved apparatus for cleaning said sand filter-beds shown in elevation in connection therewith, both apparatus and filter-bed being broken away to save space in the drawings. Fig. 2 is a plan view of a portion of a filter-bed and of my improved apparatus for cleaning the same. Fig. 3 is an enlarged plan view of a portion of my improved apparatus for cleaning filter-beds. Fig. 4 is a front elevation, partly in section, of the parts shown in Fig. 3. Fig. 5 is an enlarged transverse section of the upper portion of my improved filter-bed-cleaning apparatus, taken on line 5 5 of Fig. 1 looking toward the right in said figure. Fig. 6 is a detail section taken on line 6 6 of Fig. 5. Fig. 7 is a plan view of a mixing-chamber with a float consisting of an air-chamber attached to each of the radial end walls of said mixing-chamber. Fig. 8 is an end elevation of the mixing-chamber illustrated in Fig. 7.

Like numerals refer to like parts throughout the several views of the drawings.

In the drawings, 10 represents a sand filter-bed in transverse section, in which 11 12 are the side walls, 13 the sand composing the surface of the filter-bed, and 14 the water which is to be purified by filtration.

The apparatus is directly supported upon a supplementary carriage 15, said carriage 15 being provided with wheels 16, which run upon tracks 17, provided upon the main carriage 18. The main carriage 18 is provided with wheels 19, which run upon tracks 20 20, provided upon the upper surface of the walls 11 12. It will be seen that the main carriage 18 moves lengthwise of the filter-bed upon the tracks 20, provided upon the walls 11 12, and that the supplementary carriage, upon which my improved mechanism is directly supported, moves crosswise of the filter-bed upon the tracks 17, which extend lengthwise of the main carriage 18, but transversely of the filter-bed, and thus it will be seen that my improved apparatus may be moved lengthwise and transversely of the filter-bed as desired.

It is essential in apparatus of the character described that the cleansing device should be moved over the whole surface of the bed, that it should be capable of following the undulating surface of said bed without changing materially the relation of the working parts thereof, and that it should be capable of being raised and lowered bodily, and, further, that the sand should not be removed from the bed, but should be cleansed by raking or stirring the surface of said sand and at the same time washing it and subsequently removing the impurities, leaving the sand upon the surface of the bed thoroughly cleansed. It is very essential that in the use of a suction-pipe the same should be so attached as to remove said impurities without sucking up the surface of the sand and making inequalities in the surface of the filter-bed. To attain these results, I provide, primarily, a mixing-chamber 21, which is provided with means whereby it may be raised and lowered upon the supplementary carriage 15 and also guided to preserve the same general relation to the surface of the sand filter-bed. In the interior of this mixing-chamber I provide a rake 22, either stationary or rotary, and above the rake is provided a horizontal suction-pipe 23, which removes the impure water from said mixing-chamber, the water by which the cleansing of the sand is performed being introduced through another pipe 24. The mixing-chamber 21 is preferably closed at the top, as shown in Fig. 4; but a closed top is not absolutely essential. The mixing-chamber 21 is provided with curved side walls 25 25 and radial end walls 26 26. These four vertical walls inclose a certain area of the surface 13 and are supported upon a carrier-frame 27. Said carrier-frame consists of a central cross-bar 28, two end cross-bars 29 29, connected to said central cross-bar by side bars 30 and by brace-rods 31, fast at their outer ends to said end cross-bars and at their inner ends by means of the springs 32 to a collar 33, said collar being in turn fastened rigidly to a vertical suction-pipe 34. The vertical suction-pipe and horizontal suction-pipes 23 are joined together by a T connection 35. The horizontal suction-pipes 23 are connected to the top 36 of the mixing-chamber 21 by an elbow 37. The vertical suction-pipe 34 extends upward from the carrier-frame 27, Fig. 5, and has a collar 38, fast to the upper end thereof by means of set-screws 39. The suction-pipe 34 is splined to a bevel-gear 40 and is arranged to slide vertically in a bearing 41, fast to the supplementary-carriage platform 42. The suction-pipe 34 is guided still further in its rotary and vertical movements by a stationary pipe 43, which is fast to a cross-frame 44 upon the supplementary carriage 15 and extends downwardly therefrom into the upper end of the suction-pipe 34. A stuffing-box 45 of any desirable construction forms a tight joint between the pipes 43 and 34.

The suction-pipe 34, together with the carrier-frame 27 attached thereto and the parts hereinafter described supported upon said carrier-frame, are all raised and lowered by means of chains or wire ropes 46, which pass over pulleys 47 and are operated by means of a windlass 48 and handle 49, all supported upon the supplementary carriage 15. The ropes 46 are connected by hooks 50 to ears 51 upon the collar 38. As the suction-pipe 34 is raised and lowered the bevel-gear 40 is prevented from moving vertically by means of brackets 52, the upper ends of which project into a groove formed in the hub of said bevel-gear.

The upper end of the stationary suction-pipe 43 is connected by pipes 53 and 54 to a centrifugal suction-pump 55. The centrifugal pump 55 is rigidly attached to the platform 42 and is provided with an outlet-pipe 56, arranged to discharge into a trough 57, extending lengthwise of the main carriage 18 transversely of the filter-bed, said trough being fast to said main carriage 18 and discharging into a channel or trough 58, provided in the upper face of the wall 12, said channel conveying the water, together with the impurities contained therein, to a sewer-pipe. The centrifugal pump has a gear 59 fast to the driving-shaft 60 thereof and meshing into an intermediate gear 8, which meshes into a gear 61, fast to a shaft 62, which turns in bearings 63 upon the supplementary carriage 15 and has fast to one end thereof a bevel-gear 64, which meshes into and is driven by the bevel-gear 40. The bevel-gear 40 is in turn driven by a bevel-gear 65, fast to a shaft 66, which rotates in bearings 67 upon the supplementary carriage 15 and has a spur-gear 68 fast thereto and meshing into a pinion 69, fast to the driving-shaft of an electric motor 70. The shaft 66 has fast to the left-hand end thereof, Figs. 1 and 2, a bevel-gear 71, which meshes into bevel-gears 72 73. The bevel-gears 72 73 are alternately locked to and disengaged from a shaft 74 by a clutch 75, splined to said shaft and operated by means of a lever 76. The shaft 74 rotates in bearings 77, supported upon the supplementary carriage 15, and has a sprocket-gear 78, connected by a sprocket-chain 9 to a sprocket-gear 79, fast to a shaft 80, extending transversely of the carriage 15 and having fast at each end thereof one of the wheels 16. The wheels 16 are rotated by means of said shaft and run upon the tracks 17, thus propelling the supplementary carriage and the parts carried thereby lengthwise of the main carriage 18 and transversely of the filter-bed. The main carriage 18, together with the supplementary carriage and the parts carried thereon, are propelled lengthwise of the filter-bed by means of a motor 81, supported upon the main carriage and having a gear 82 fast to the driving-shaft thereof. Said gear 82 meshes into a gear 83, fast to a shaft 84, which rotates in bearings 85 upon the main carriage 18 and has fastened to one end thereof a bevel-gear 86, which meshes into bevel-gears 87 and 88. The bevel-gears 87 and 88 are alternately locked to and disengaged from a shaft 89 by means of a clutch 90, operated by a lever 91. The shaft 89 rotates in bearings 92, fast to the main carriage 18, and has fastened to one end thereof a sprocket-gear 93, which is operatively connected by a sprocket-chain 94 to a sprocket-gear 95. The sprocket-gear 95 is fast to a shaft 96, extending lengthwise of the main carriage 18 and rotating in bearings 97 thereon. At each end of the shaft 96 is fastened one of the wheels 19, and as said wheels are rotated by the mechanism hereinbefore described through the shaft 96 the main carriage 18 is propelled lengthwise of the filter-bed, together with the supplementary carriage thereon and the parts supported by said supplementary carriage.

The mixing-chamber 21 is preferably divided into two compartments 98 99 by a horizontal perforated partition 100. In the lower compartment 99 is provided a rake 22, which may be rigidly fast to the chamber 21, but is preferably arranged to rotate as shown in Figs. 3 and 4. Said rake consists of arms 101, formed of pipe and having hollow teeth 102 fast thereto and projecting downwardly therefrom, said hollow teeth being provided with discharge-outlets 103. The rake 22 is fast to the lower end of a rotary water-pipe 104, said rotary water-pipe being connected, through a packing-box 105 and elbow 106, to a horizontal water-pipe 24. The water-pipe 24 is stationary as regards rotary movement, but revolves with the carrier-frame 27 and is connected by pipes 107 108 to a rotary pump 109. Said rotary pump 109 is driven by a sprocket-gear 110, connected by a sprocket-chain 111 to a sprocket-gear 112, fast to the driving-shaft 113 of the electric motor 114, and draws the supply of water from the surface of the filter-bed by means of a pipe 128.

The rake 22 at the left of Figs. 3 and 4 is rotated by a bevel-gear 115, fast to the pipe 104 and meshing into a bevel-gear 116, fast to a shaft 117, which turns in bearings 118 119, supported upon the carrier-frame 27. The shaft 117 has fast to the right-hand end thereof a sprocket-gear 120, connected by a sprocket-chain 121 to a sprocket-gear 122, fast to the shaft 113.

A mixing-chamber, rake, and suction-pipe are provided at the right-hand end of the carrier-frame 27, Fig. 1, and the construction of said parts is the same as that of similar parts described and shown at the left-hand end of Figs. 1, 3, and 4, the rake at said right-hand end of the carrier-frame being driven by a horizontal shaft 123, which rotates in bearings 124 upon the carrier-frame and has fast to the left-hand end thereof a sprocket-gear 125, driven by a sprocket-chain 126, which in turn is driven by a sprocket-gear 127, fast to the shaft 113.

The teeth of the rake 22 preferably project below the surface of the sand 13, so that the water which is forced out through the discharge-outlets 103 in the hollow teeth 102 passes upwardly through the sand and washes the impurities therefrom into the lower compartment 99 of the mixing-chamber 21. Said sand is at the same time thoroughly stirred by the rotary motion of the rake, in combination with the transverse and longitudinal motion imparted to the said rake by the carriages 15 and 18, respectively, and at the same time the rake is revolved about a center not its own, being carried bodily in a circle by means of the carrier-frame 27, so that the film incrusting the sand and impurities on the upper surface of the sand are thoroughly stirred up and mixed in the lower compartment 99, the suction applied through the pipe 23 drawing these impurities and the water contained in the lower compartment into the upper compartment 98, the partition 100 being provided for the purpose of separating the sand which enters the interior of said mixing-chamber from the water and the impurities therein which pass up through said perforated partition, being drawn upwardly into the upper compartment 98 by the centrifugal suction-pump 55. The surface of the filter-bed is not necessarily perfectly level, and being somewhat undulating in order that the teeth of the rake 22 should always project to the same depth below the surface of the sand and that said mixing-chamber, together with other parts hereinbefore described, should bear the same relative location to said surface, it is necessary that means should be provided to guide said mixing-chamber over the surface of the sand, and in Figs. 1, 3, and 4 I have illustrated such means, consisting of a guiding-plate 129, fastened to the front end wall 26 of each mixing-chamber. Said guide-plates are curved upwardly at the outer ends 130 in order to slide easily over any obstructions or inequalities which they may encounter while being revolved by the carrier-frame 27. As a further means of allowing the mixing-chamber and the rake to adapt themselves to the surface of the filter-bed the carrier-frame 27 is supported by braces 31, connected to the collar 33 by springs 32, as hereinbefore described, and the connection of these spring-braces is such as to allow the outer end of the carrier-frame, together with the mixing-chamber and rake, to descend until the teeth of the rake project into the surface of the sand by the weight of said mixing-chamber. The carrier-frame 27 being somewhat flexible in construction allows said mixing-chamber and rake to descend a slight distance, such as would be represented by the inequalities of the surface of the filter-bed.

The specific construction of the mixing-chamber 21 and of the rotary rake inclosed therein is substantially the same as that shown and described in another application made by me of even date, entitled "Apparatus for cleaning sand filter-beds," Serial No. 105,776, filed May 3, 1902; but in said application Serial No. 105,776 the mixing-chamber and rake are carried directly upon a supplementary carriage, the rake being rotated about an axial center located inside said mixing-chamber, no rotary or revolving motion being imparted to the mixing-chamber itself. In the apparatus hereinbefore described the mixing-chamber and rake are supported upon a carrier-frame which rotates in a horizontal plane, thus revolving the mixing-chamber and the rake about an axial center located outside said mixing-chamber, the rake also having imparted thereto a rotary motion about an axial center located inside said mixing-chamber, in this particular instance said axial center being the center of the vertical pipe 104. Throughout the specification and claims of this application the word "rotate" as applied to the rake is used in its proper sense—viz., moved about its own axial center—and the word "revolve" is used to indicate a motion of parts about an axial center not their own. In the application hereinbefore referred to, Serial No. 105,776, the mixing-chamber is moved lengthwise and transversely of the filter-beds over the whole surface thereof by means of a main and supplementary carriage similar to that hereinbefore described and the rake inclosed within said mixing-chamber is rotated about an axial center located inside said mixing-chamber. In the structure set forth in this application the rake and mixing-chamber are moved lengthwise of the filter-bed and transversely thereof and are at the same time both revolved about an axial center located outside said mixing-chamber— viz., the vertical suction-pipe 34—the rake inclosed within the mixing-chamber having imparted thereto a rotary motion about an axial center located inside said mixing-chamber.

The general operation of the apparatus hereinbefore described is as follows: Assuming the mixing-chamber and the parts connected thereto to have been lowered to the surface of the filter-bed, as shown in Fig. 1, and to be located in one corner of said filter-bed, the motor 114 is started, thus rotating the rake inclosed within the mixing-chamber, together with the pipe 104, by means of the gears 115 116, together with the shaft 117, sprocket-gear 120, sprocket-chain 121, sprocket-gear 122. The carrier-frame is now rotated, revolving the mixing-chambers and rakes at each end thereof about the suction-pipe 34 as a center by means of the suction-pipe to which said carrier-frame is fastened, said suction-pipe 34 being rotated, as hereinbefore set forth, by the electric motor 70 through the gears 69 68, shaft 66, and bevel-gears 67 and 40. Water is at the same time taken from the surface of the filter-bed and supplied to the mixing-chamber by means of the pump 109 through the pipes 128, 108, 107, 24, and 104, as hereinbefore described. Simultaneously with the rotary motion imparted to the carrier-frame 27 and to the suction-pipe 34 the supplementary carriage is propelled transversely of the filter-bed by means of the bevel-gear 71 and one of the gears 72 73, one of said gears being thrown into clutch with the shaft 74 by the lever 76. When the supplementary carriage has traveled across the filter-bed, the motion of said carriage is stopped by throwing the clutch-lever into its central position and then propelling the main carriage 18 lengthwise of the filter-bed by means of the motor 81, which is thrown into engagement with the gearing hereinbefore described for propelling the shaft 96 by means of the lever 91 and clutch 90. These lengthwise and transverse movements of the two carriages are repeated until the whole surface has been traversed by the mixing-chambers, and during these transverse and longitudinal movements of the mixing-chambers the rakes have been kept constantly in rotation and both rake and mixing-chamber have been revolved by the mechanism hereinbefore described. It will be seen that the rake is rotated about its own center and at the same time is revolved about the center of the suction-pipe 34 by means of the carrier-frame 27, upon which it is supported. While the mixing-chamber and rake are thus propelled over the sand of the filter-bed the centrifugal pump 55 is kept constantly in operation by means of the gearing hereinbefore described, said gearing being driven by means of the electric motor 70, and the water, mixed with the impurities which have been stirred up by the rake 22 and by the water issuing from the discharge-outlets 103, is drawn by the centrifugal pump through the horizontal suction-pipes 23 and the vertical suction-pipe 34 and discharges through the outlet-pipe 56 into the trough 57, thence flowing into the channel 58, formed in the upper surface of the wall 12 of the filter-bed, and thence flowing to any desirable outlet.

While I have described the water as being forced into the mixing-chambers by means of a pump which draws its supply from the surface water of the filter-bed, it is evident that water may be forced into said mixing-chambers from other sources, if considered desirable, without departing from the spirit of my invention.

In Figs. 7 and 8 I have illustrated air-chambers 131 131, fastened to the radial end walls 132 132 of the mixing-chamber 133. Said mixing-chamber is similar to the mixing-chamber 21, hereinbefore described, with the exception that valves 134 134 are provided upon the curved side walls 135 135 instead of upon the radial end walls, said valves being pivoted to said end walls 139 and held normally in a vertical position by springs 140. The object of the valves 134 134 is to allow the ingress or egress of the water to the mixing-chamber for the purpose of keeping the water in the interior of said chamber at its normal level. While I have illustrated in Figs. 7 and 8 the bottom of the air-chamber 131 formed and acting as a guide-plate, it is evident that a guide-plate the same as hereinbefore shown and described in connection with Fig. 3 may be used and the air-chamber constructed as an independent fixture, preferably of a V shape. The air-chamber 131 is preferably formed of sheet metal and forms an air-tight compartment, the end walls forming a continuation of the curved end walls 135 135, the lower wall 136 preferably being constructed to act as a guide-plate, performing the function of the guide-plate 129, hereinbefore described, and the upper wall 137 of said air-chamber being inclined downwardly from the top of the mixing-chamber 133 to meet said lower wall and form in conjunction therewith a V, which constitutes a cut-water. The object of the air-chambers 131 131 in addition to cutting the water and enabling the mixing-chamber to be more easily forced through the water is to assist the springs 32 in sustaining the weight of the mixing-chamber, so that the same may not drag too heavily upon the surface of the filter-bed or dig into said filter-bed to too great a depth. The chambers 131 131 being air-tight act as floats, so that the pressure of the mixing-chamber and parts connected therewith upon the surface of the filter-bed may be adjusted to a slight weight of, perhaps, ten pounds. If desirable, a valve 138 may be provided in the side wall of the air-chamber through which water may be admitted to the interior of said air-chamber, and thus adjust to a nicety the pressure of the mixing-chamber and floats upon the surface of the filter-bed.

Having thus described my invention, what I claim, and desire by Letters Patent to secure, is—

1. In an apparatus for cleaning filter-beds, a mixing-chamber, mechanism for carrying said mixing-chamber lengthwise and transversely of said filter-beds, a guide resting upon the upper surface of said filter-beds and fast to said mixing-chamber to determine the height of said mixing-chamber in relation thereto, and mechanism to revolve said mixing-chamber, about an axial center located outside said mixing-chamber.

2. In an apparatus for cleaning filter-beds, a mixing-chamber, mechanism for carrying said mixing-chamber lengthwise and transversely of said filter-beds, means guided by the upper surface of said filter-beds to determine the relative location of said mixing-chamber to said surface, and mechanism to revolve said mixing-chamber, about an axial center located outside said mixing-chamber.

3. In an apparatus for cleaning filter-beds, a mixing-chamber, means for carrying said mixing-chamber over the surface of said filter-beds, means guided by the upper surface of said filter-beds to determine the relative location of said mixing-chamber to said surface, and mechanism to revolve said mixing-chamber, about an axial center located outside said mixing-chamber.

4. In an apparatus for cleaning filter-beds, a mixing-chamber, means for carrying said mixing-chamber over the surface of said filter-beds, a guide resting upon the upper surface of said filter-beds and fast to said mixing-chamber to determine the relative location of said mixing-chamber to said surface, and mechanism to revolve said mixing-chamber, about an axial center located outside said mixing-chamber.

5. In an apparatus for cleaning filter-beds, a mixing-chamber, means for washing the surface of the sand surrounded by said mixing-chamber, means for carrying said mixing-chamber over the surface of said filter-beds, and mechanism to revolve said mixing-chamber, about an axial center located outside said mixing-chamber.

6. In an apparatus for cleaning filter-beds, a mixing-chamber, means for washing the surface of the sand surrounded by said mixing-chamber, a rake surrounded by said mixing-chamber, means for carrying said mixing-chamber over the surface of said filter-beds, and mechanism to revolve said mixing-chamber and rake, about an axial center located outside said mixing-chamber.

7. In an apparatus for cleaning filter-beds, a mixing-chamber, means for discharging water below the surface of the sand inclosed by said mixing-chamber, a rake surrounded by said mixing-chamber, means for carrying said mixing-chamber over the surface of said filter-beds, and mechanism to revolve said mixing-chamber and rake, about an axial center located outside said mixing-chamber.

8. In an apparatus for cleaning filter-beds, a mixing-chamber, means for conveying water downwardly below the surface of the sand inclosed by said mixing-chamber, a rake surrounded by said mixing-chamber, means for carrying said mixing-chamber over the surface of said filter-beds, and mechanism to revolve said mixing-chamber and rake, about an axial center located outside said mixing-chamber.

9. In an apparatus for cleaning filter-beds, a mixing-chamber, a rake surrounded by said mixing-chamber, said rake provided with hollow teeth arranged to project downwardly and provided with outlets to discharge water below the surface of said filter-beds, means for carrying said mixing-chamber over the surface of said filter-beds, and mechanism to revolve said mixing-chamber and rake, about an axial center located outside said mixing-chamber.

10. In an apparatus for cleaning filter-beds, a mixing-chamber, a rake surrounded by said mixing-chamber, said rake formed of pipe and having hollow teeth projecting downwardly from said pipe, said hollow teeth provided with outlets to discharge water below the surface of said filter-beds, means to connect said rake to a water-supply, and mechanism to revolve said mixing-chamber and rake, about an axial center located outside said mixing-chamber.

11. In an apparatus for cleaning filter-beds, a mixing-chamber, a rake surrounded by said mixing-chamber, mechanism to rotate said rake about an axial center located within said mixing-chamber, and mechanism to revolve said rake and mixing-chamber, about an axial center located outside said mixing-chamber.

12. In an apparatus for cleaning filter-beds, a mixing-chamber, a rake surrounded by said mixing-chamber, mechanism to rotate said rake about an axial center located within said mixing-chamber, means for carrying said mixing-chamber over the surface of said filter-beds, a suction-pipe connected to said mixing-chamber, and mechanism to revolve said mixing-chamber, about an axial center located outside said mixing-chamber.

13. In an apparatus for cleaning filter-beds, a mixing-chamber, a rake surrounded by said mixing-chamber, mechanism to rotate said rake about an axial center located within said mixing-chamber, means for carrying said mixing-chamber over the surface of said filter-beds, a suction-pipe connected to said mixing-chamber, and mechanism to rotate said suction-pipe about its axial center and revolve said mixing-chamber about an axial center located outside thereof.

14. In an apparatus for cleaning filter-beds, a vertical suction-pipe, a horizontal suction-pipe fast to the lower end thereof, a mixing-chamber fast to said horizontal suction-pipe, and mechanism to rotate said vertical suction-pipe and revolve said mixing-chamber, about an axial center located outside said mixing-chamber.

15. In an apparatus for cleaning filter-beds, a vertical suction-pipe, a horizontal suction-pipe fast thereto, a mixing-chamber fast to said horizontal suction-pipe, a rake inclosed within said mixing-chamber, and mechanism to rotate said vertical suction-pipe and revolve said rake and mixing-chamber about an axial center located outside said mixing-chamber.

16. In an apparatus for cleaning filter-beds, a vertical suction-pipe, a horizontal suction-pipe fast thereto, a mixing-chamber fast to said horizontal suction-pipe, a rake inclosed within said mixing-chamber, mechanism to rotate said rake about an axial center located within said mixing-chamber, and mechanism to revolve said rake and mixing-chamber about an axial center located outside said mixing-chamber.

17. In an apparatus for cleaning filter-beds, a vertical suction-pipe, a horizontal suction-pipe fast thereto, a mixing-chamber fast to said horizontal suction-pipe, a rake inclosed within said mixing-chamber, mechanism to rotate said rake about an axial center located within said mixing-chamber, and mechanism to rotate said vertical suction-pipe and revolve said mixing-chamber and rake, about an axial center located outside said mixing-chamber.

18. In an apparatus for cleaning filter-beds, a vertical suction-pipe, a carrier-frame fast thereto and arranged to rotate in a horizontal plane, a mixing-chamber supported upon said carrier-frame, and mechanism to rotate said suction-pipe and carrier-frame, about an axial center located outside said mixing-chamber and revolve said mixing-chamber about said axial center.

19. In an apparatus for cleaning filter-beds, a vertical suction-pipe, a carrier-frame fast thereto and arranged to rotate in a horizontal plane, a mixing-chamber supported upon said carrier-frame, a rake inclosed within said mixing-chamber, mechanism supported on said carrier-frame to rotate said rake about an axial center located within said mixing-chamber, and mechanism to rotate said suction-pipes and carrier-frame, about an axial center located outside said mixing-chamber.

20. In an apparatus for cleaning filter-beds, a vertical suction-pipe, a carrier-frame fast thereto and arranged to rotate in a horizontal plane, a rake formed of pipe supported upon said carrier-frame, and revolved by said carrier-frame about an axial center located outside said rake, and a water-supply pipe connected to said rake.

21. In an apparatus for cleaning filter-beds, a vertical suction-pipe, a carrier-frame fast thereto and arranged to rotate in a horizontal plane, a rake formed of pipe supported upon said carrier-frame and revolved by said carrier-frame about an axial center located outside said rake, a water-supply pipe connected to said rake, and mechanism to rotate said rake about its own axial center.

22. In an apparatus for cleaning filter-beds, a vertical suction-pipe, a carrier-frame fast thereto and arranged to rotate in a horizontal plane, a mixing-chamber supported upon said carrier-frame and revolved by said carrier-frame about an axial center located outside said mixing-chamber, a horizontal suction-pipe connecting said mixing-chamber and vertical suction-pipe, a rake formed of pipe surrounded by said mixing-chamber, and a pump supported upon said carrier-frame and operatively connected to pump water from the surface of said filter-bed to said rake.

23. In an apparatus for cleaning filter-beds, a carrier-frame arranged to rotate in a horizontal plane, a mixing-chamber supported upon said carrier-frame and revolved by said carrier-frame about an axial center located outside said mixing-chamber, a rake formed of pipe surrounded by said mixing-chamber, and a pump supported on said carrier-frame and operatively connected to pump water from the surface of said filter-bed to said rake.

24. An apparatus for cleaning filter-beds comprising a carriage arranged to travel lengthwise of said beds, a vertical suction-pipe, a pump operatively connected to said pipe, and mechanism to rotate said pipe, all supported upon said carriage; a carrier-frame fast to said suction-pipe and arranged to rotate in a horizontal plane, a mixing-chamber supported upon said carrier-frame and revolved by said carrier-frame about an axial center located outside said mixing-chamber, a horizontal suction-pipe connecting said mixing-chamber and vertical suction-pipe, a rake formed of pipe surrounded by said mixing-chamber, a pump supported on said carrier-frame and operatively connected to pump water from the surface of said filter-bed to said rake.

25. In an apparatus for cleaning filter-beds, a rake, mechanism to rotate said rake about its axial center, and mechanism to revolve said rake about an axial center located outside and parallel to the axial center of said rake.

26. In an apparatus for cleaning filter-beds, a vertical suction-pipe, a carrier-frame fast to the lower end thereof and arranged to rotate in a horizontal plane, a mixing-chamber, and a rake supported upon said carrier-frame and revolved by said carrier-frame about an axial center located outside said mixing-chamber, and supporting-springs connected from said suction-pipe to said carrier-frame.

27. In an apparatus for cleaning filter-beds, a mixing-chamber, mechanism for carrying said mixing-chamber lengthwise and transversely of said filter-beds, and a float fast to said mixing-chamber.

28. In an apparatus for cleaning filter-beds, a mixing-chamber, mechanism for carrying said mixing-chamber lengthwise and transversely of said filter-beds, mechanism to revolve said mixing-chamber, and an air-chamber fast to one of the walls of said mixing-chamber.

29. In an apparatus for cleaning filter-beds, a mixing-chamber, mechanism for carrying said mixing-chamber lengthwise and transversely of said filter-beds, mechanism to revolve said mixing-chamber, and a V-shaped air-chamber fast to one of the walls of said mixing-chamber and constituting both a float and a cut-water.

30. In an apparatus for cleaning filter-beds, a mixing-chamber, mechanism for carrying said mixing-chamber lengthwise and transversely of said filter-beds, mechanism to revolve said mixing-chamber, and an air-chamber fast to one of the walls of said mixing-chamber, the under side of said chamber curved upwardly at its front end and acting as a guide-plate.

In testimony whereof I have hereunto set my hand in presence of two subscribing witnesses.

HIRAM W. BLAISDELL.

Witnesses:
CHARLES S. GOODING,
ANNIE J. DAILEY.